July 20, 1926.
W. S. DE CAMP
1,592,969
SLACK ADJUSTER FOR AIR BRAKES
Filed Oct. 30, 1925     2 Sheets-Sheet 2
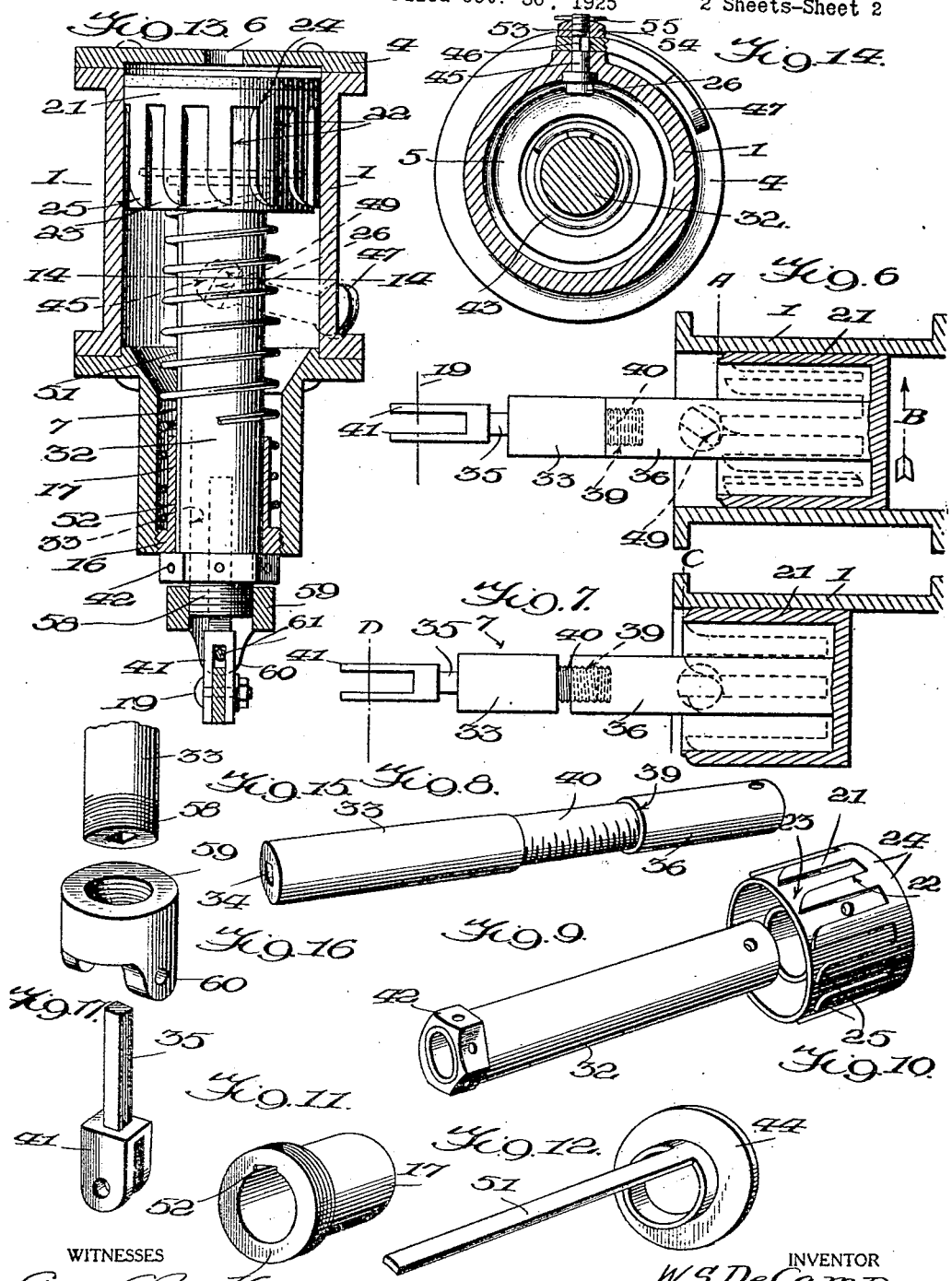

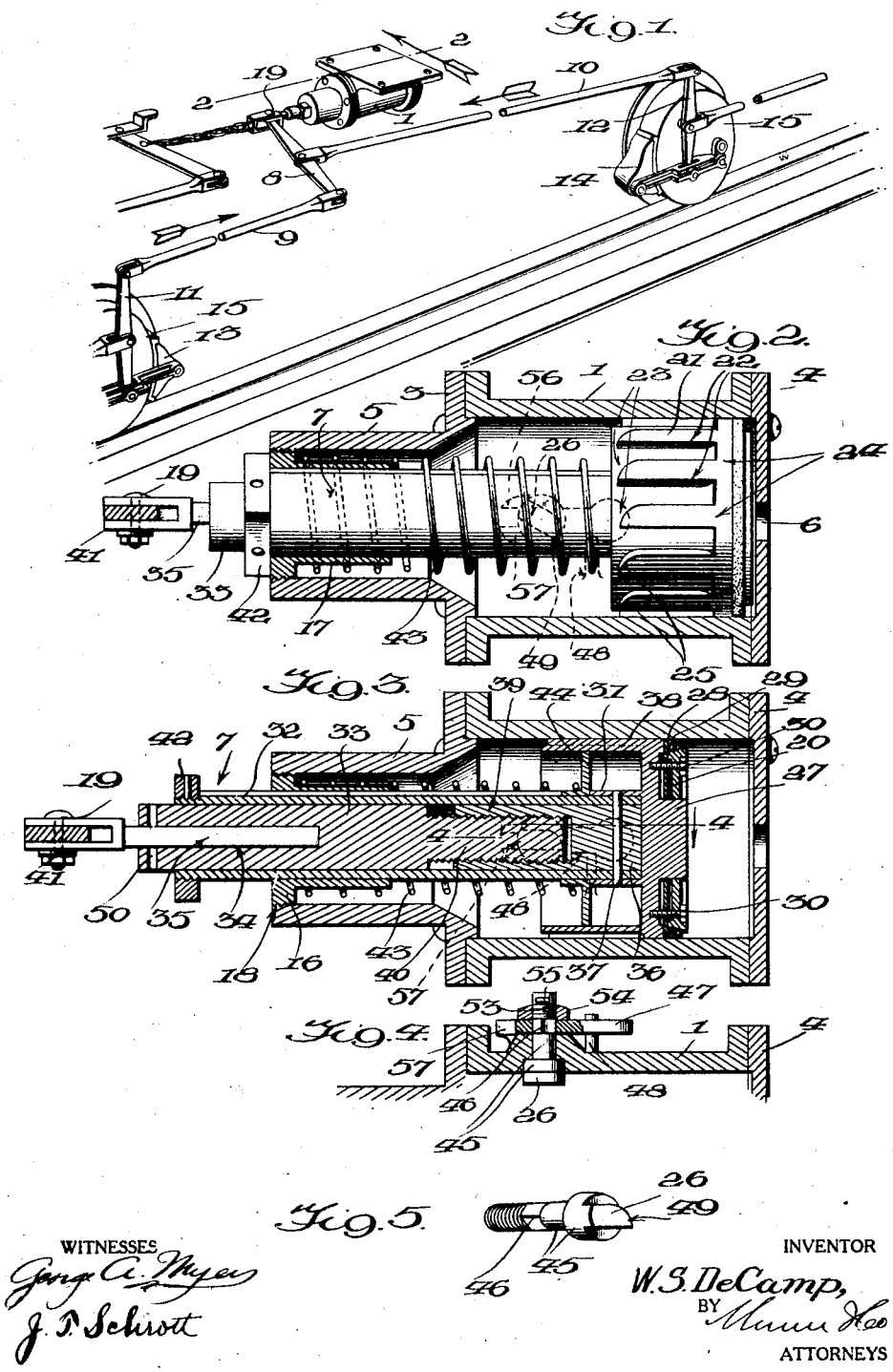

Patented July 20, 1926.

1,592,969

UNITED STATES PATENT OFFICE.

WILLIAM S. DE CAMP, OF CHILLICOTHE, OHIO.

SLACK ADJUSTER FOR AIR BRAKES.

Application filed October 30, 1925. Serial No. 65,817.

This invention relates to improvements in slack adjusters for air brakes, and it consists of the constructions, combinations and arrangements herein described and claimed.

An object of the invention is to incorporate in the piston and plunger of a brake cylinder, means for periodically adjusting the brake shoes in respect to the wheels as required, one of the outstanding features thereof being means to prevent turning of the release spring so that a counter-rotation of the pisition may not occur when the piston moves back to the release position.

Other objects and advantages appear in the following specification, reference being had to the accompanying drawings, in which—

Figure 1 is a diagrammatic perspective view of enough of an air brake system for reference in connection with the slack adjuster.

Figure 2 is a longitudinal section of the brake cylinder taken substantially on the line 2—2 of Figure 1, showing the piston in the brake shoe releasing position.

Figure 3 is a similar sectional view showing the piston in the brake shoe application position.

Figure 4 is a detail horizontal section taken substantially on the line 4—4 of Figure 3.

Figure 5 is a detail perspective view of the pawl hereinafter referred to.

Figure 6 is a sectional diagram illustrating the approximate action of the piston when the brake shoe is comparatively new.

Figure 7 is a sectional diagram illustrating the action when the brake shoe has begun to wear.

Figure 8 is a detail perspective view of the automatically extensible core.

Figure 9 is a detail perspective view of the plunger sleeve.

Figure 10 is a detail perspective view of the improved piston.

Figure 11 is a detail perspective view of the key bushing.

Figure 12 is a detail perspective view of the washer and key which cooperates with the bushing to prevent turning of the spring.

Figure 13 is a sectional view of the brake cylinder as applied in the vertical position.

Figure 14 is a detail horizontal section on the line 14—14 of Figure 13.

Figure 15 is a detail perspective view of the lower end of the core in Figure 13.

Figure 16 is a detail perspective view of the collar which is screwed thereon.

Figure 17 is a detail perspective view of the non-circular rod seen in Figures 2, 3 and 13.

This invention is an improvement in the automatic slack adjuster for air brakes disclosed in my co-pending application, Serial #22,203, filed April 10, 1925. The general purpose of the invention is brought out in that application, but it is deemed necessary to repeat some of the description here so that the purpose of the improvement may be understood.

The purpose of a device of the character herein contemplated is to so adjust the slack in an air brake system that the brake shoes will be moved up to the faces of the various wheels, as wear occurs, thereby keeping the brake system in proper condition. The brakes are applied by the movement of a piston under the influence of air pressure, and according to the invention, a certain turning of the piston on the application stroke operates to automatically take up the slack in the piston. The spring is used to return the piston on the release stroke, but it has been found that the spring has a tendency to counter-rotate the piston in some instances and thereby negative the intended adjustment.

The object of the improvement is to prevent that action of the spring which tends to counter-rotate the piston.

In Figure 1 the brake cylinder 1 has heads 3 and 4 which close the ends thereof, the first head including a tubular extension 5, the second head having an opening 6 which may be regarded as communicating with a triple valve mechanism (not shown) by the action of which air under compression is admitted to the cylinder.

A plunger, generally designated 7, operates in the cylinder 1 and tubular extension 5, and when thus operated causes rocking of the cylinder lever 8 (Fig. 1) so that power is applied to the pull rods 9 and 10 in the direction of the arrows, all of this being according to established practice. The extremities of the pull rods have connection with brake levers 11 and 12 which in turn act upon the brake shoes 13 and 14, moving them against the faces of wheels 15 in order to perform the braking action. The foregoing structure is to be found on passenger and freight cars, locomotives and street cars.

The piston 21 (Figs. 2, 3 and 10) moves to the left in the brake cylinder 1 when compressed air is admitted at the passage 6 projecting the plunger 7 to rock the cylinder lever 8 as stated. The surface of the piston is interrupted by a plurality of parallel and longitudinal grooves 22 which give the surface a fluted appearance and provide an alternate arrangement of grooves and ribs. The grooves open at the skirt extremity of the piston, as at 23, but fall short of and are closed at the head extremity as at 24. One corner of each rib, resulting from the formation of the grooves, is rounded at 25 for the purpose of coacting with a pawl 26 (Fig. 5) and causing a partial rotation of the piston 21 in the counter clockwise direction when a certain amount of wear of the brake shoes 13 and 14 has occurred.

A circular follower head 20 (Fig. 3) fits upon a central boss 27 on the piston and aids in holding the customary cup packing 28 in place upon the piston head. An expansible resilient ring 29 is interposed between the inner edge of the follower head and the base of the cup washer. A number of suitable screws 30 secure the follower head upon the piston. Upon the return stroke of the piston the expanding ring and cup leather packing assist in holding the piston in the position to which it has been turned. The return stroke of the piston is limited by engagement with the cylinder head 4.

An internal collar 31 which is integral with the piston head (Fig. 3) fixedly carries a sleeve 32 and core 33. The core has a non-circular bore 34 in which the corresponding non-circular rod 35 fits. The sleeve 32, core 33 and rod 35 all comprise the plunger previously designated 7 in general. These parts move as one when air is admitted against the head of the piston 21. The core 33 includes a section 36 which is secured to the sleeve 32 by a pin 37 admitted at an opening 38 in the piston 21.

A threaded bore 39 in the section 36 receives the threaded stem 40 of the core 33, and when the turning of the piston occurs (as mentioned before) a separation of the core 33 from the section 36 in the axial direction results, advancing the common pivot 19, at which the plunger 7 joins the lever 8, in respect to the plunger 7. This advancement of the common pivot will pull up on the rods 9 and 10 (Fig. 1) thereby gradually adjusting the brake shoes 13 and 14 to compensate for wear. The bifurcated head 41 at which the common pivot 19 makes connection of the lever 8 with the rod 35 keeps the rod from turning and also keeps the core 33 from turning by engagement of the non-circular rod with the non-circular bore 34. The core 33 therefore can reciprocate but cannot turn.

A hexagonal nut 42, suitably secured upon the end of the sleeve 32, permits manual turning of the sleeve and its connected parts, including the section 36, so that the section can be screwed back upon the threaded stem 40 to assume the original adjustment when the old and worn brake shoes are replaced by new ones. A wrench is applied to the nut 42 for the purpose. It is necessary to turn the parts back so that the automatic adjustment of slack may again begin from the starting point.

A spring 43 returns the piston upon release of the compressed air from the piston head at the right end. This spring bears against the circular shoulder 16 of a bushing 17 at one end of the brake cylinder, and against a washer 44 (Fig. 3) which rests against the collar 31. The bushing is screwed in place at 18 in the otherwise free extremity of the tubular extension 5. The washer 44 (Figs. 3 and 12) has a long narrow extension or key 51 which fits in a groove 52 on the interior of the bushing 17. Inasmuch as the bushing 17 is fixed, rotation of neither the washer 44 nor spring 43 can take place and the likelihood of a counter-rotation of the piston 21 when moving into the release position is therefore obviated. The pawl 26 is journaled in the side of the brake cylinder 1 (Fig. 4). It comprises a stub shaft 45 of two diameters, providing a shoulder which prevents pulling through of the pawl. The stub shaft has a non-circular end 46 upon which a lever 47 is fitted. The lever represents a weight which normally holds the pawl 26 down in the position shown in Figures 2, 3 and 6. The downward movement of the pawl is limited by the engagement of the lever with a stop 48 on the side of the cylinder. The stub shaft terminates in a threaded portion 53 which receives a nut 54 to hold the lever in place. The nut, in turn, is retained by a cotter 55. A heel 56 on the lever (Fig. 2) is engaged with a stop 57 which limits the turning of the stub shaft in one direction.

Figures 13 to 16 inclusive illustrate an adaptation of the invention to a brake cylinder in the vertical position. The arrangement here shown is employed particularly upon a locomotive. As is seen in Figure 13 the principal construction is the same as that in Figures 2 and 3, but some slight differences are involved and these are described farther down. It is also to be noted that the lever 47 is so fitted upon the non-circular section 45 that the free end thereof rests upon the adjacent flange of the cylinder 41. In order that this may effectively be done, the lever is given a slight curvature (Figs. 13 and 14).

The operation is readily understood from the foregoing description. Assume first that each of the brake shoes 13 and 14 (Fig. 1) is practically new. The core 33 and rotatable base section 36 will be screwed together as in Figs. 3 and 6. A stroke of the piston 21 in the cylinder 1 under the influence of compressed air admitted to the right end at the opening or passage 6, will extend approximately to the broken line A (Fig. 6). The nearest rounded approach 25 will barely touch the pawl 26, the upper end of which is correspondingly rounded at 49. The action of the pull rods 9 and 10 (Fig. 1) resulting from the movement of the piston 21, applies the brake shoes.

As wear occurs on the faces of the brake shoes 13 and 14, the piston 21 must travel farther upon each brake application stroke in order to obtain the original result. These slightly increased strokes of the piston 21 will find the leading edge of the piston skirt advancing beyond the line A (Fig. 6) so that the rounded approach 25 moves farther toward the rounded end 49 of the pawl. The pawl is fixed so far as downward movement is concerned, and the foregoing advancement of the piston will result in a slight turning of the piston over toward the observer (Fig. 6) in the direction of the arrow B, this being the counter-clockwise direction when looking at the head of the piston.

This turning of the piston unscrews the core 33 from the base section 36. The common pivotal point 19 becomes advanced gradually in respect to the plunger 7. This gradual advancement has the effect of holding the brake shoes 13 and 14 closer to the face of the wheels 15 each time. Were it not for the key 51 there is a possibility that the spring 43 may have the effect of turning the piston 21 backward when performing the release stroke, this undoing the work done upon the application stroke. This effect is brought about by the tendency of the spring to wind up in one or the other direction, the increased tension stored therein when thus wound up serving to produce the objectionable counter turning of the piston. But by locating the spring between the stationary shoulder 16 and the stationary washer 15 (the washer being stationary so far as turning is concerned) no turning of the spring can result.

The advancement of the piston 21 beyond the line A (Fig. 6) continues until a stroke extends to the broken line C (Fig. 7). The position herein shown represents the limit of turning of the piston 21 by the effort of one rib against the pawl 26. The piston 21 moves back to the right end of the cylinder 21 when the pressure is released and as soon as the pawl 26 is released from the position in Figure 7 it gravitates back to the inclined position in Figure 6.

The rounded approach 25 of the fixed rib will ride up on the rounded end 49 of the pawl and cause a turn of the piston 21 equal to all of the fractional turns imparted to the piston in leading up to the position at the line C. The next application stroke of the piston may cause a similar turn of the piston, each causing more unscrewing of the core 33. The common pivotal point 19 may ultimately reach the position D (Fig. 7) at which the wear of the brake shoes may be compensated for, and subsequent turning of the piston 21 by virtue of the approaches 25 riding down upon the pawl 26 will then have the effect of adjusting the piston 21 farther back in the cylinder so that its application strokes will ultimately again end at the line $a$ (Fig. 6).

As stated before, in the event that the slack adjuster is used upon a locomotive (Fig. 13) the brake cylinder 1 assumes a vertical position so that connection may be made with the locomotive brake system. For this purpose the core 33 is threaded at the exposed extremity as at 58 in order that the collar 59 may be screwed thereupon. This collar has a pair of ears 60. The pin 61 (Fig. 13) is insertible through these ears and through the bifurcated head 41 of the non-circular rod 35. The purpose of this particular arrangement is this: Upon movement of the piston 21 and core 7 to the brake application position the non-circular rod 35 has its engagement with the core 33 to provide the necessary solid connection, but upon the release stroke the return of the non-circular rod depends upon the gravitation of the articulated brake connections to return said rod with the piston and core which move upwardly by virtue of the spring 43. Inasmuch as the pin 51 now connects the rod 35 with the core 33 through the medium of the collar 59 the foregoing articulated brake connections are immediately moved to the release position when the piston and core are returned by the spring as stated.

I claim:

1. A slack adjuster for air brake systems comprising a brake cylinder, a piston operable in said cylinder, a plunger carried by the piston including a sectional core, means by which connection of one of the sections is made with the brake connections of said system, means upon the piston for turning the piston upon an application stroke, means carried by the cylinder engageable by said means on the piston thereby producing said turning, means utilizing said turning of the piston to produce relative movement of said core sections to thereby actuate said brake connections, and means associated with the piston to prevent counter-turning of the piston upon the release stroke 2. A slack adjuster for air brake systems comprising a brake cylinder, a piston operable in said cylinder, a plunger carried by the piston including a sectional core, means by which pivotal connection of one of the sections is made with the brake connections of said system, means upon the piston for turning the piston upon an appplication stroke, means carried by the cylinder engageable by said means on the piston thereby producing said turning, resilient means against which the piston acts and in respect to which said turning occurs, means utilizing said turning of the piston to produce relative movement of said core sections to thereby shift said pivotal connection, and means preventing counter-turning of the piston by said resilient means when the piston returns upon its release stroke.

3. A slack adjuster for air brake systems comprising a brake cylinder, a piston operable in said cylinder, a plunger carried by the piston including a sectional core, means by which connection of one of the sections is made with the brake connections of said system, means upon the piston for turning the piston upon an application stroke, means carried by the cylinder engageable by said means on the piston thereby producing turning, a spring against which the piston acts on the application stroke and by which the piston is returned on the release stroke, means utilizing said turning of the piston to produce relative movement of said core sections to thereby shift the point of connection, and means upon which the spring ends have such bearing that the turning of the piston does not affect the spring, thereby obviating any counter-turning of the piston upon said release stroke.

4. A slack adjuster for air brake systems comprising a brake cylinder, a piston operable in the cylinder, a plunger carried by the piston with which pivotal connection of a member of the brake system is made, means associated with the piston and cylinder for producing turning of the piston upon upon an application stroke, means incorporated in the plunger for advancing said pivotal connection by virtue of said turning of the piston, resilient means against which the piston acts upon such stroke and by which the piston is made to perform a release stroke, and means which prevent imparting the turning motion of the piston to said resilient means thereby permitting said means to return the piston without producing counter-turning thereof.

5. A slack adjuster for air brake systems comprising a brake cylinder, a piston operable in the cylinder, a plunger carried by the piston including a sectional core, one section of which is fixed to the piston, means by which pivotal connection is made with the remaining core section and a cylinder lever, means associated with the air brake cylinder piston for producing periodical turning of the piston, a threaded connection between the core sections causing relative extension of the pivotal connection in respect to said fixed section, means including a spring for returning the piston after an application stroke, means including a washer providing a mounting for that end of the spring adjacent to the piston, means including a bushing in fixed relationship to the foregoing movable parts of the slack adjuster, said bushing having a groove, and means including a key extending from the washer and fitting in the groove to prevent turning of the washer so that the turning of the piston may not be communicated to the spring.

6. A slack adjuster for air brake systems comprising a brake cylinder, a piston operable in said cylinder, a plunger carried by the piston including a sectional core, means by which pivotal connection of one of the sections is made with the brake connection with said piston, means including ribs upon the piston for turning the piston upon an application stroke, means including a pawl carried by the cylinder being engageable by said ribs on the piston and producing said turning, a stub shaft carrying said pawl being mounted in the wall of the cylinder and having a shoulder preventing the pulling out of the pawl, gravity operated means carried by the stub shaft normally keeping the pawl in one position and having associated means preventing excessive turning of the pawl, and means utilizing the foregoing turning of the piston to produce relative movement of said core sections to thereby shift said pivotal connection.

7. In a slack adjuster, a brake cylinder having a tubular extension, a piston reciprocable in the cylinder and having a plunger passing through said extension, a spring tending to resist the application stroke of the piston and causing a release stroke of the piston, a washer associated with the piston against which one end of the spring bears, and means against which the opposite end of the spring bears serving to hold the washer against turning, said means including a bushing fixed in the tubular extension and having a groove, and a key extending from the washer along the plunger and through the groove.

8. In a slack adjuster, a brake cylinder, a piston reciprocable in the cylinder having lips thereupon for turning the piston on an application stroke, a two-diameter stub shaft journaled in the wall of the cylinder and having a pawl exposed on the interior of the cylinder to be engaged by said ribs to produce a turning, a non-circular portion on said stub shaft carrying a lever, means on the cylinder against which the lever gravitates to hold the pawl in a normal position to receive the ribs and means on the stub shaft to hold the lever in place including a threaded portion on the stub shaft, a nut screwed thereupon and a cotter to hold the nut in place.

9. A slack adjuster comprising a brake cylinder, a piston movable in one direction in the cylinder by fluid pressure, a plunger carried by the piston including a core terminating in a threaded end, means by which the plunger is connected to articulated brake connections, said means including a collar screwed upon said threads, a non-circular rod loosely carried by the core and having a bifurcated head at which said brake connections are made, ears pendant from the collar, a pin transfixing the ears and bifurcated head, and a spring in the cylinder serving to reversely move the piston upon a release stroke, said pin then serving to return the non-circular rod with the core and producing a prompt release of said brake connections.

WILLIAM S. DE CAMP.